United States Patent [19]

Finesman, deceased, et al.

[11] Patent Number: 5,193,439

[45] Date of Patent: Mar. 16, 1993

[54] PROGRAMMABLE ELECTRIC TOASTER

[75] Inventors: Alvin B. Finesman, deceased, late of New Canaan, by Marion A. Finesman, executrix, Conn.; Yosuke Shiotani, Komaki, Japan

[73] Assignee: Sanyei Corporation of Nagoya, Japan

[21] Appl. No.: 637,449

[22] Filed: Jan. 4, 1991

Related U.S. Application Data

[63] Continuation-in-part of Ser. No. 297,687, Jan. 13, 1989, abandoned.

[51] Int. Cl.$^5$ .................................................. A47J 37/08
[52] U.S. Cl. ................................. 99/327; 99/335; 99/344; 99/385; 99/391; 99/393; 219/492; 219/493; 219/506
[58] Field of Search ............... 99/280, 281, 325–327, 99/331, 332, 334, 335, 342, 344, 385, 391, 393, 403, 410; 219/10.55 B, 492, 493, 506, 518

[56] References Cited

U.S. PATENT DOCUMENTS

| | | | |
|---|---|---|---|
| 2,147,376 | 2/1939 | Lucia | 99/344 |
| 2,578,971 | 12/1951 | Georgeson | 99/327 |
| 2,724,322 | 11/1955 | Parr | 99/391 |
| 3,336,858 | 8/1967 | Maindonald | 99/327 |
| 3,599,312 | 8/1971 | Hitzeroth | 99/327 |
| 4,402,258 | 9/1983 | Guarnerio | 99/393 |
| 4,487,115 | 12/1984 | Su | 99/327 |
| 4,518,849 | 5/1985 | Rolland | 99/327 |

FOREIGN PATENT DOCUMENTS

| | | | |
|---|---|---|---|
| 2105974 | 4/1983 | United Kingdom | 99/327 |
| 2197578 | 5/1988 | United Kingdom | 99/385 |

Primary Examiner—Philip R. Coe
Assistant Examiner—Mark Spisich
Attorney, Agent, or Firm—Ostrolenk, Faber, Gerb & Soffen

[57] ABSTRACT

An apparatus is provided for the automatic toasting of bread and other bakery products. The toaster includes a cool wall housing with a single elongated toast slot and a digital display and control panel. Provided within the housing is an automatic elevator controlled by a programmable microchip control device for selectively timing the operation of the elevator and toasting functions. In the preferred embodiment, three programs may be entered into memory and recalled according to personal taste or variety of bakery products.

21 Claims, 9 Drawing Sheets

PROGRAMMABLE ELECTRIC TOASTER

This application is a continuation-in-part application of co-pending application Ser. No. 07/297,687, filed Jan. 13, 1989, now abandoned.

BACKGROUND OF THE INVENTION

This invention relates to electric toasters, and particularly to toasters which can be electronically controlled and programmed to provide a toasted product to suit various tastes.

Automatic electric toasters have been used in the home for decades to toast slices of bread and other bakery items such as English muffins, crumpets, bagels and prepared pastries. Most toasters include simple adjustment mechanisms to regulate the degree of toasting by the setting of a mechanical timer to raise the toast at the appropriate time and simultaneously turn off the toaster at the desired degree of toasting from light to dark.

Alternatively, the degree of toasting can be determined by the use of temperature and/or humidity sensors such as thermistors. Unfortunately, automatic toasters must be reset to vary the degree of toasting according to individual tastes or variety of bakery goods toasted. This is usually accomplished by trial and error, resulting in unsatisfactory results and waste.

According to the invention, there is provided an automatic electric toaster for food products including a housing; toasting means located within said housing for receiving and radiantly toasting food products; automatic elevator means associated with said toasting means for lowering said food products from a first raised position for access to the food products to a second lowered position for toasting said food products; and programmable control means for operatively controlling said toasting means and said elevator means, said programmable control means including means for recording and operatively running a plurality of predetermined and preselected toasting cycle programs.

The automatic toaster embodying the present invention provides a simple, efficient and attractive means of toasting a variety of bakery goods to different tastes and degrees of toasting, without the need to reset a timer or other such control each time such tastes change.

The toaster, in its preferred embodiment, includes a programmable automatic elevator system which can be set to a variety of tastes. The automatic elevator system is controlled by a microchip which includes a programmable timer function. A number of programs are available, e.g., three, corresponding to three different time settings, which, in turn, correspond to three different degrees of toasting. In use, after toast is inserted in the unit's slot, the toaster is programmed to a specified time, preferably by pressing a single button, and started. The toast is then automatically lowered and toasted. Near the end of the allotted time the toast is automatically elevated while an alarm tone is sounded.

It is a principal feature of the invention to provide a digitally programmable automatic toaster capable of toasting a variety of bakery goods to a variety of tastes.

It is another feature of the invention to provide such a toaster with an automatic toast elevator system that is raised and lowered by means of an electric motor.

It is a further feature of the invention to provide such a toaster with a digital clock display to count down the remaining time until the toast is ejected from the toaster.

It is a still further feature of the invention to provide a toaster which will include a compensation factor to adjust for various degrees of preheating of the unit.

An embodiment of the invention will now be described in reference to a toaster and by way of example only with the understanding that food products other than just bread slices could be toasted with the present invention.

SUMMARY OF THE INVENTION

Thus, the present invention relates to an automatic electric toaster for food products comprising a housing; toasting means located within said housing for receiving and radiantly toasting food products; automatic motor driven elevator means associated with the toasting means for lowering the food products to a first position for toasting and raising the food products to a second position for access; and programmable control means coupled to the elevator motor for generating signals to raise the elevator means, the programmable control means including means for recording and operatively running a plurality of predetermined and preselected toasting cycle programs for controlling the toasting means.

DETAILED DESCRIPTION

Figure 1:
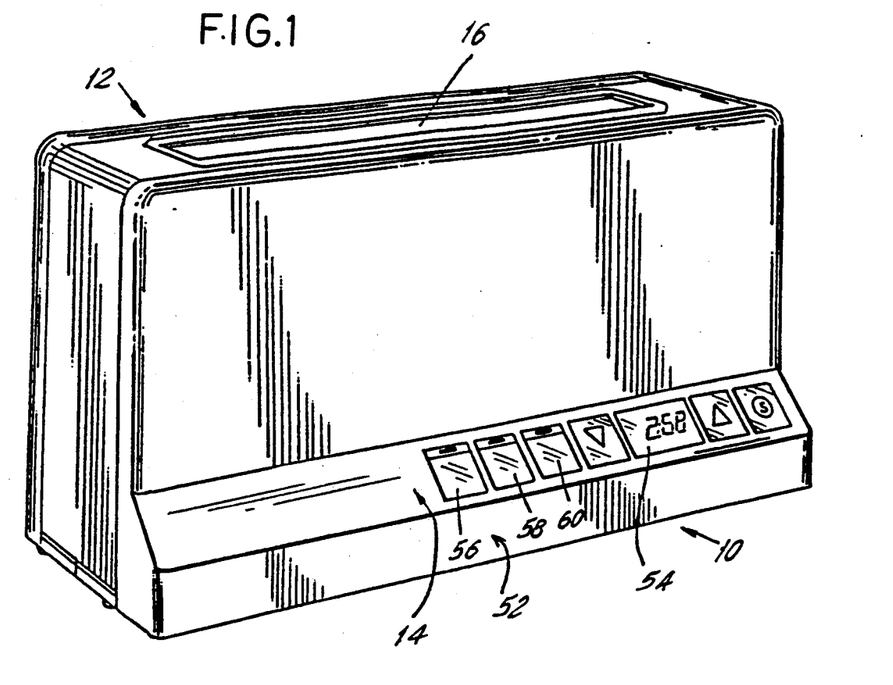
FIG. 1 is a general perspective view of a toaster embodying the present invention.

Referring now to FIG. 1 of the drawings, an automatic electric toaster embodying the present invention is generally indicated by reference character 10. Shown in this figure is the exterior housing 12 which includes forwardly extending control panel 14 and single, elongated toast slot 16.

Figure 2:
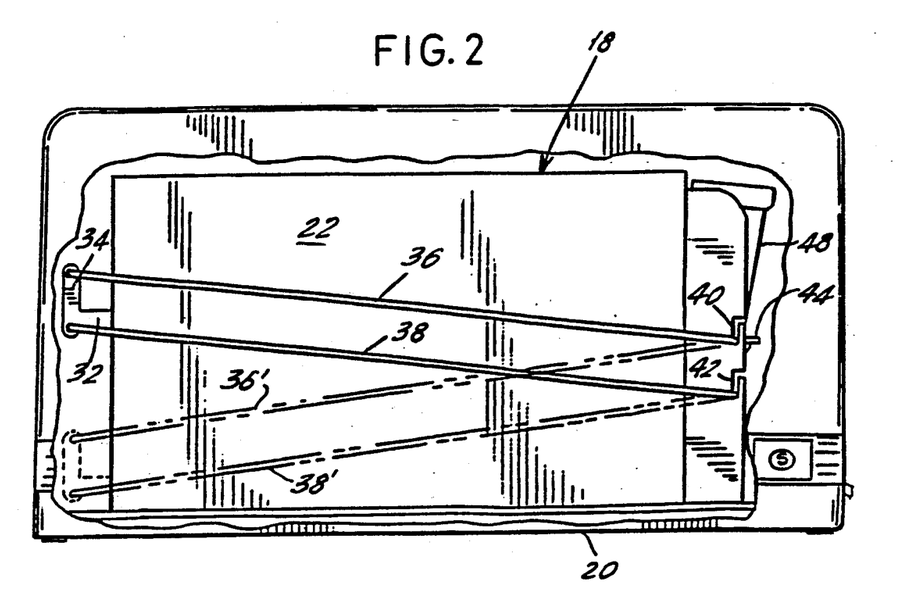
FIG. 2 is a partially broken away front elevation of the toaster shown in FIG. 1.
Figure 3:
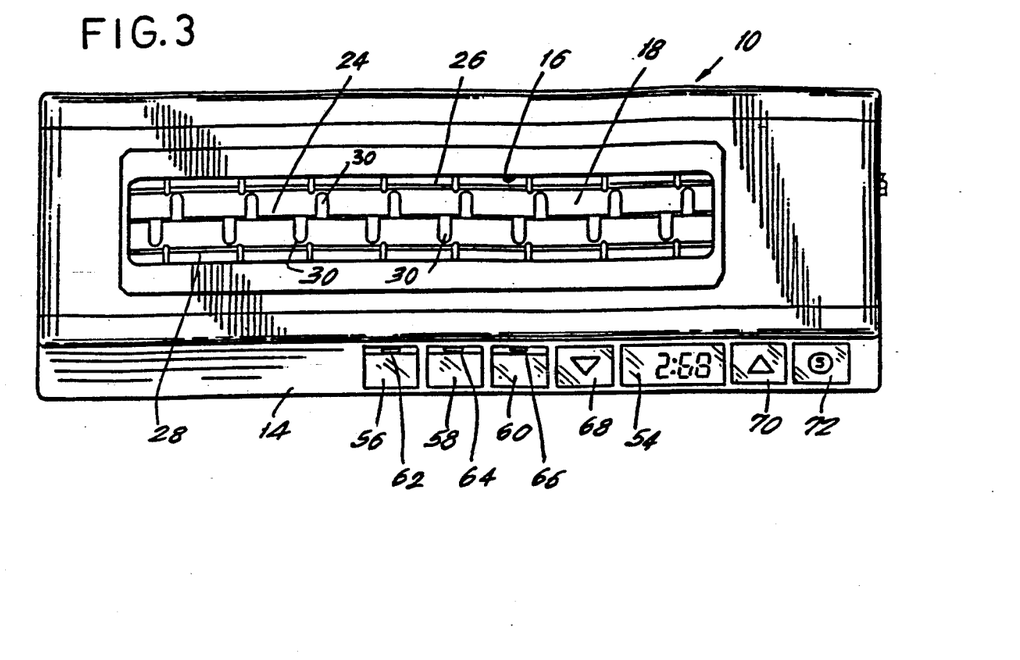
FIG. 3 is a top plan view of the toaster as shown in FIG. 1.
Figure 4:
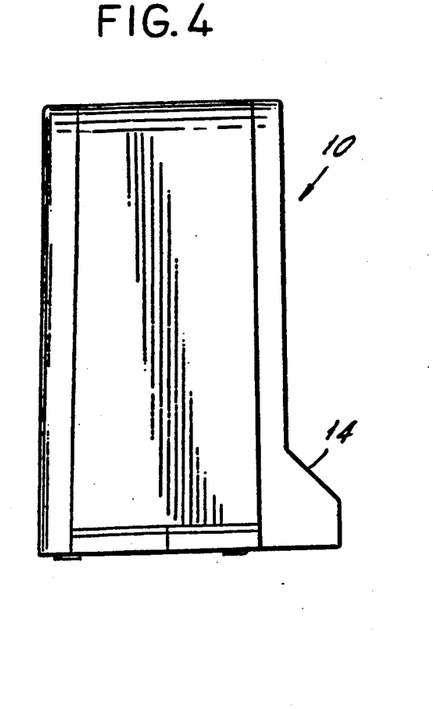
FIG. 4 is a left side elevation of the toaster as shown in FIG. 1.
Figure 5:
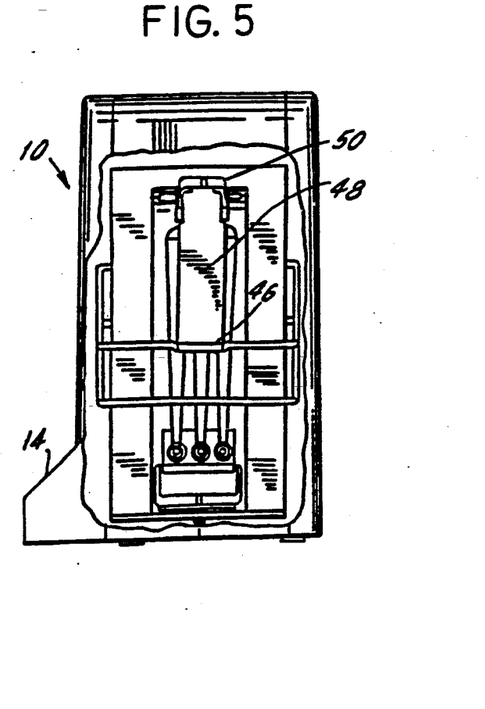
FIG. 5 is a partially broken away right elevation of the toaster as shown in FIG. 1.

The toaster shown is of a cool-wall design and constructed with the outer housing 12 formed by any suitable material such as plastic. As shown in FIG. 2, motor driven elevator structure 18 is located within housing 12 on and fixed to housing base 20. As shown in FIGS. 2 and 3, the elevator structure 18 is aligned with housing slot 16 to provide for insertion of toast or other food products through slot 16 into structure 18.

Structure 18 includes elevator housing 22 which is formed of metal. Horizontal toast support 24 is located within elevator housing 22 and aligned with slot 16.

Also located within housing 22 are inwardly biased vertical toast guard grids 26 and 28 which serve to center the toast and maintain it in a vertical position as it is being toasted, as well as to automatically adjust to the width of the bread inserted. Support 24 includes horizontal tabs 30 bent from support arm 32. Appended to arm 32 at one end is link extension 34.

Upper and lower parallel links 36 and 38, respectively, substantially encircle elevator structure 18 and are pivotally mounted to link extension 34 and pivotally mounted in slots 40 and 42, respectively, in structure 18 at the opposite end thereof.

Upper link 36 is provided with crank 44 adjacent to slot 40. Rotatably attached to crank 44 is lower end 46 of actuator band 48, which, in turn, is driven by elevator motor 50. As actuator band 48 is raised by motor 50, crank 44 is raised. This movement, in turn, pivots upper link 36 downward to the position denoted as 36' shown in phantom FIG. 2. As this occurs, lower link 38, being attached to link extension 34, moves downward toward lower position 38', also shown in phantom. Support arm 32 is maintained in horizontal position by parallel linkages 36 and 38. In this manner, the toast is lowered into the toaster. The opposite action raises the toast.

The actions of motor 50 and the corresponding linkages are controlled by a microchip control device (FIG. 6) contained within lower housing 52 at the base of toaster 10. The control device is shielded from the heat of the toaster. The microchip control device includes a clock function to include the time of toasting. Operatively connected to the microchip control device is light emitting diode (LED) clock/timer display 54 which may ordinarily display the time of day. When the toaster is in use, however, the LED display 54 displays the time remaining in the toasting cycle.

Also included on control panel 14 are program select buttons 56, 58 and 60 and associated LED indicator lights 62, 64 and 66, respectively. Timer control switches 68 and 70 are pressure sensitive and flank LED display 54. Also provided is pressure sensitive start/stop button 72.

Figure 6:
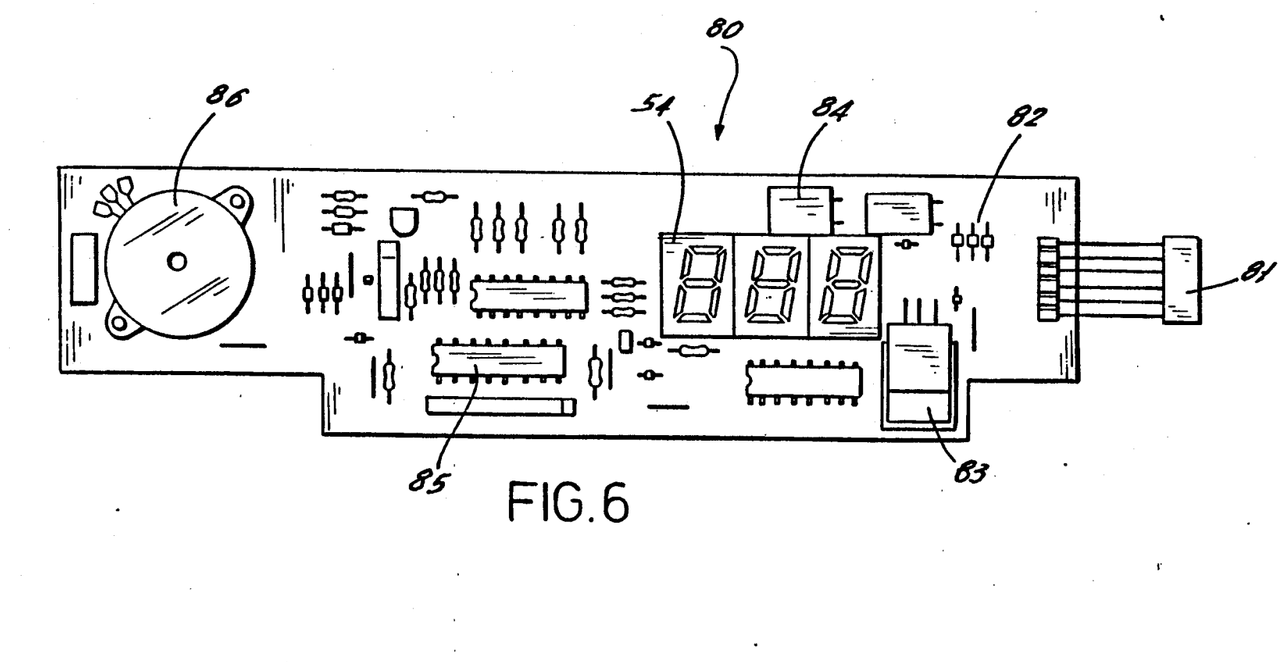
FIG. 6 is a view of an electronic controller assembly of the toaster as shown in FIG. 1.

The electronic controller assembly 80 shown in FIG. 6 is mounted in the lower housing 52 with LED display 54 visible through a suitable window or aperture in the housing. Power is supplied to the assembly through connector 81 from a suitable transformer (not shown) within the toaster housing. The circuit uses conventional techniques and includes rectifiers 82, regulator 83 and capacitors 84 for providing a regulated DC supply, CPU chip 85 (e.g., NEC T15566) for executing a stored program of instructions, acoustic transducer 86, and the necessary interfacing components. Outputs from the assembly are taken via connector 81 to motor 50 via a relay (not shown).

In this embodiment, three program times may be stored in the memory of the microchip control device. This memory will be maintained as long as an AC current is provided to the unit. A battery may be added, if desired, to maintain the stored program times in the event of a power failure. The microchip may be preprogrammed in manufacture to times corresponding to typical light, medium or dark toast settings.

To set a program, the timer display is adjusted by means of timer control switches 68 and 70 to decrease or increase the number shown on the display. When the appropriate time is displayed it may be entered into any of the three memories by pressing any one of the three program buttons, 56, 58 or 60 and holding the button for a specified period of time.

In use, toast or any other suitable bakery product is placed in slot 16 between inwardly biased grids 26 and 28, which automatically adjust to the width of the bread. A program is then recalled by momentarily pressing one of the program buttons 56, 58 or 60, which then illuminates corresponding LED indicator 62, 64 or 66 and displays the appropriate time on LED display 54. When the start/stop button is pressed, the toast is automatically lowered by the elevator mechanism into housing 22 which contains typical radiant heating elements such as elements 116 and 111 shown in FIG. 8A. As the bread is toasted, the display 54 counts down the remaining time left in the program. With approximately five seconds remaining on the program, a tone, controlled by the microchip control device, is sounded at 86 in FIG. 6 as the toast is slowly raised by the automatic elevator.

When the toasting cycle is complete, the previously programmed time is then automatically reset and displayed on display 54. At any time prior to the completion of the cycle, the cycle may be aborted by pressing the start/stop button 72.

A compensation factor is mathematically built into the logic in the microchip to compensate for the preheating of the toaster and its gradual cooling. This compensation factor subtracts time from the selected program in inverse relation to the amount of time since the last use of the toaster. In this manner, a toaster which has been used recently will toast a second batch of bread in a correspondingly shorter period of time to the same degree of toasting.

It is also contemplated, although not shown in this embodiment, that a defrost cycle may be provided to warm frozen bakery goods at a lower power setting. A fourth program button may be provided for this function and the reduced power may be provided by cycling the heater on and off with an appropriate duty ratio. If desired, the defrost cycle may automatically be followed by a period at full power for toasting the thawed product.

Figure 7:
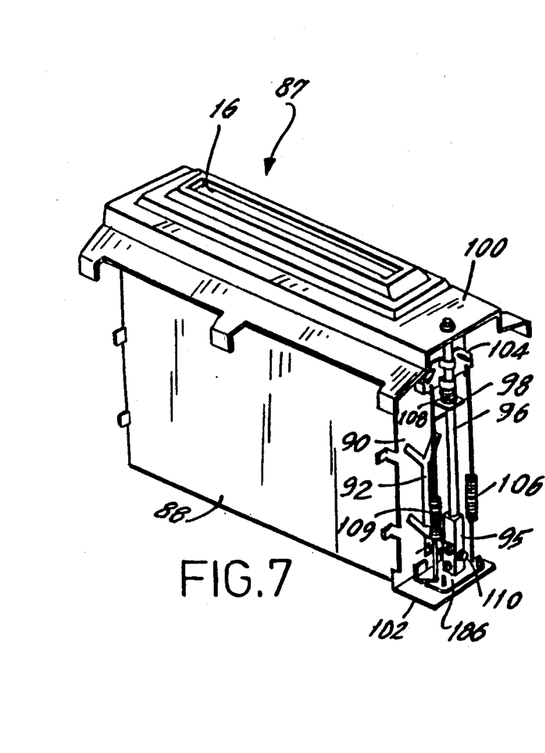
FIG. 7 is an isometric view of the internal completed toaster mechanical assembly.

An alternate embodiment of the invention includes a mechanical assembly 87 of the toaster illustrated in FIG. 7 in its assembled condition. It includes the slot 16 for inserting the toast or other food product. It has a side plate 88 and an end plate 90. The end plate 90 includes a slot 92 through which projects the end 94 of the toast support structure 18. The projecting end 94 is attached by screws or other fastening means to a carriage assembly 95 that is slidably mounted on cylindrical elongated shaft 96. The elongated cylindrical shaft 96 passes through an orifice in a support 98 that is integrally formed with, and extends horizontally from, the end plate 90. It also passes through an orifice 101 in top plate 100 and an orifice 103 in bottom panel 102. Further, the shaft 96 passes through an orifice in an upper guide plate 104 and lower guide plate 186 which are used to maintain the toast guards against the toast or other food product placed in slot 16. The manner in which this is accomplished will be disclosed hereafter. Springs 106 and 107 are coupled between orifices in upper guide plate 104 and orifices 107 and 111 in lower guide plate 186. A second spring 108 is located under the upper guide plate 104 and above the projection 98 to tend to force the guide plate 104 in the upward direction. Springs 106 and 107 tend to force upper guide plate 104 in the downward direction. The carriage member 95 has a protruding pin 110 to which a motor is coupled, as will be described hereafter, to move the carriage from a first upward position to provide access to the toast or other food product placed in the slot 16 to a second lowered position for toasting the food product placed in slot 16.

Figure 8A:
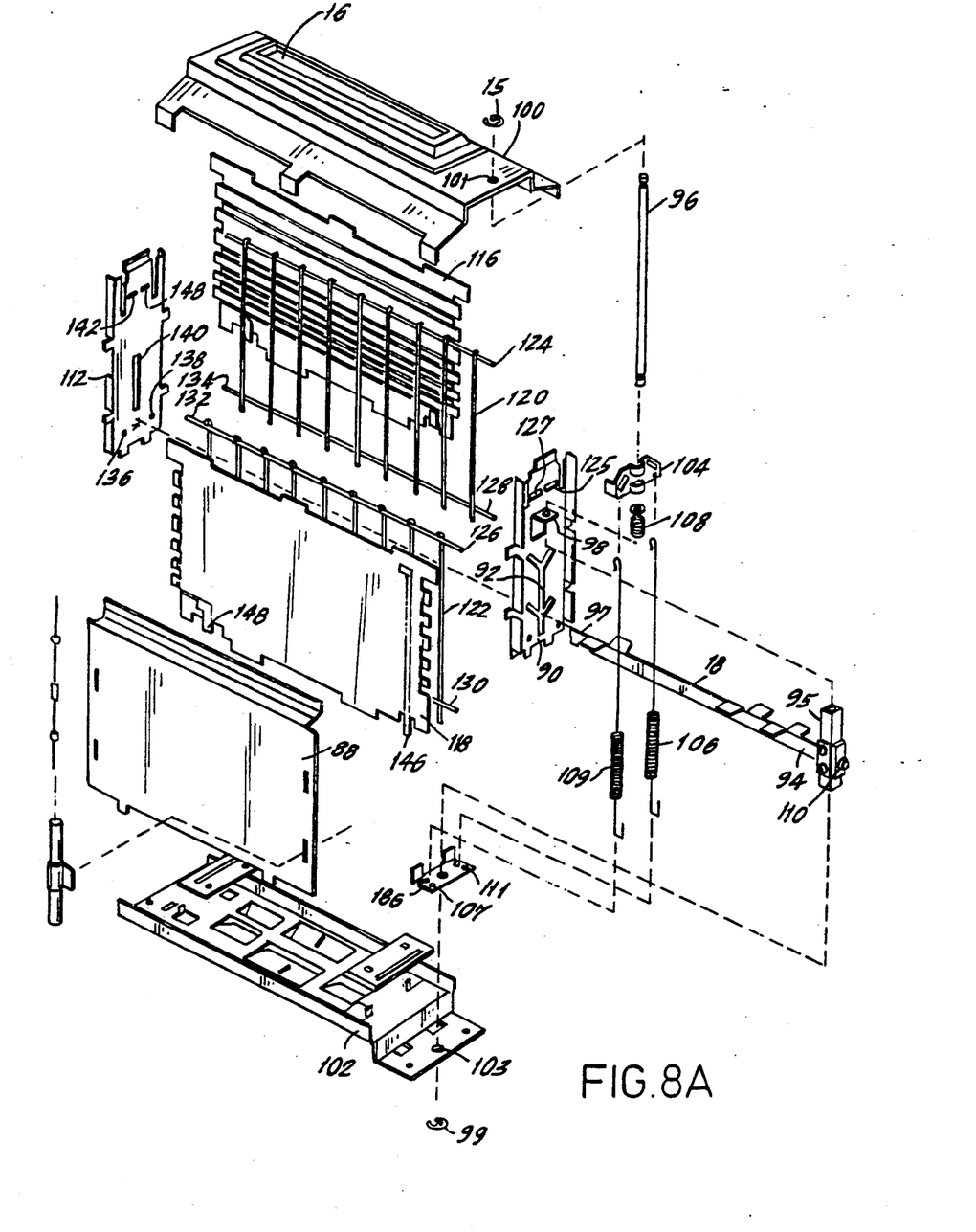
FIG. 8A is an exploded view of the toaster mechanical assembly of FIG. 7 without the motor assembly attached thereto.

FIG. 8A is an exploded view of the mechanical assembly illustrated in FIG. 7. As will be seen in FIG. 8A, the mechanical assembly includes an upper plate 100 and a lower plate 102, a first side plate 88 and a second side plate 114. It also includes a front end plate 90 and a rear end plate 112. Heating elements 116 and 118 are typical heating elements and are formed with electrical contacts 146 and 148 that couple to electric power contacts for causing the heating elements to generate heat. Toast guards 120 and 122 are adjustable to the size of the toast and maintain a slight pressure on the toast to keep it centered between the heating elements 116 and 118. Toast support structure 18 has one end 94 that extends through slot 92 in front end panel 90 and a portion 97 that extends through slot 140 in rear end portion 112. The elongated cylindrical shaft 96 is held in place by orifice 101 in top plate 100 and secured by a mechanical E-type ring clip 95, an orifice in horizontal projection 98 and by an orifice 103 in bottom panel 102 and secured with an E-type clip ring 99.

Figure 8B:
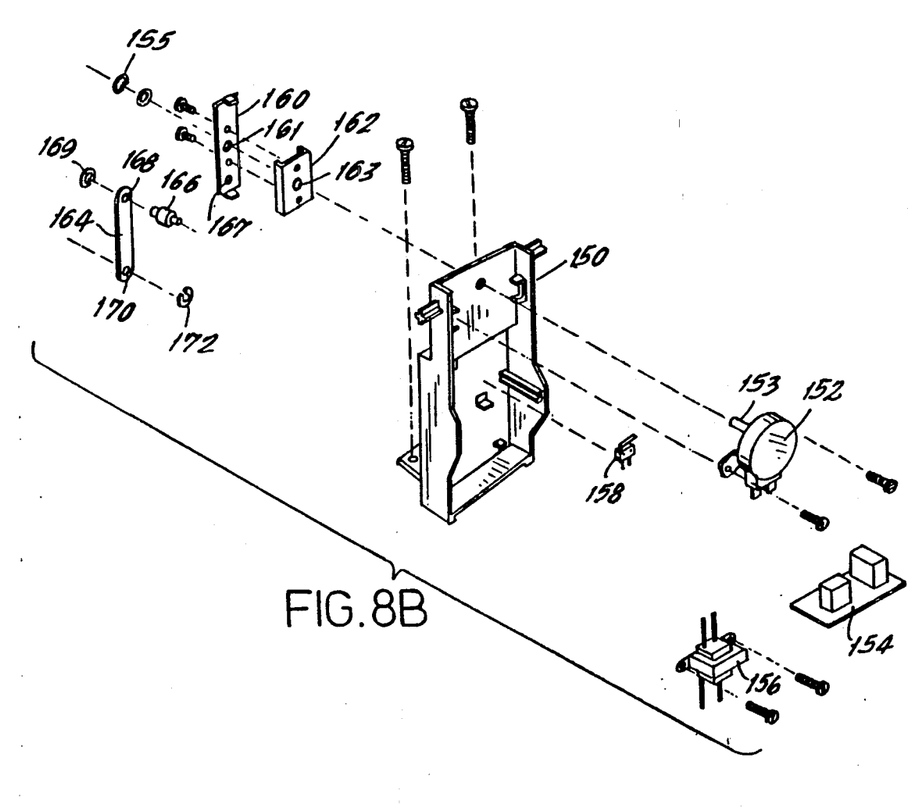
FIG. 8B is an exploded view of the motor assembly that attaches to the mechanical assembly of FIG. 8A.

An exploded view of the motor assembly for automatically raising and lowering the toast support structure 18 is illustrated in FIG. 8B. It includes a panel 150 to which is mounted a motor 152 having a rotatable shaft 153. Also mounted on the panel 150 is a relay assembly 154 for selectively coupling power to the motor 152 and a transformer 156 for supplying power thereto from a typical household electrical socket. A microswitch 158 is also mounted on the panel 150 in proximity to the motor for determining when the motor has raised the toast support structure 18 to its first upward position or its second lowered position. A first plate 160, which is a flat rectangular elongated plate, has a central orifice 161 therein through which shaft 153 of motor 152 protrudes. A retainer 162 has an orifice 163 through which the motor shaft 153 projects to lock the plate 160 with respect to the shaft 153.

Shaft 160 has a second orifice 166 at one end thereof which receives a coupling pin 166. The other end of coupling pin 166 is received by an orifice 168 at one end of a second flat rectangular elongated plate 164. The pin 166 is held in place in any well-known manner, such as with E-type ring clip 169. The second plate 164 has a second orifice 170 at the other end for receiving pin 110 of carriage assembly 95. Thus, as first plate 160 is rotated by motor 152, second plate 164 moves the carriage assembly 95 attached thereto in a vertical direction on shaft 96. Thus, rotation of motor 152 for 180° causes the toast support structure 18 to be moved from its first upper position to its second lowered position for toasting. The next 180° movement of plate 160 by motor 152 causes the toast supporting structure 18 to move from its second lowered position to its first upper position for removal of the toast. The microswitch 158 detects when the motor has moved the toasting support 18 to its upper or lower position and stops rotation of the motor 152 at that point.

Figure 9A:
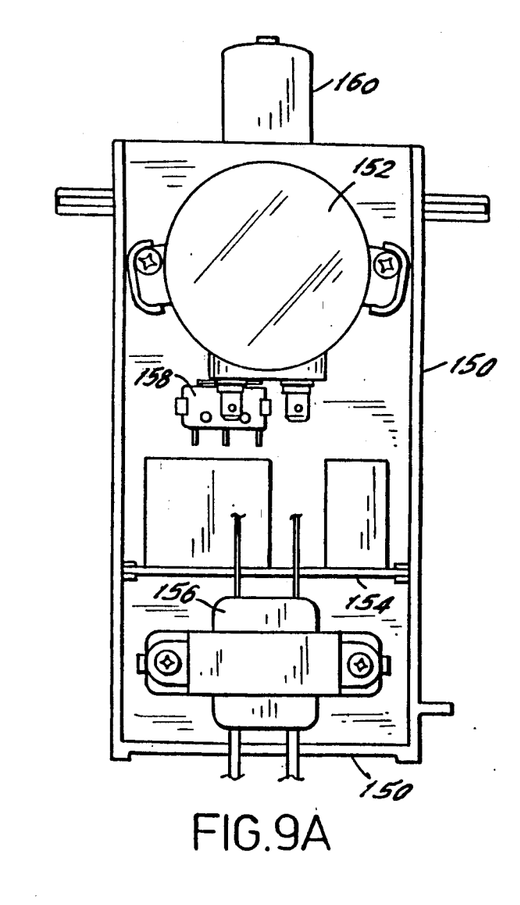
FIG. 9A is an enlarged front view of an assembled motor assembly.
Figure 9B:
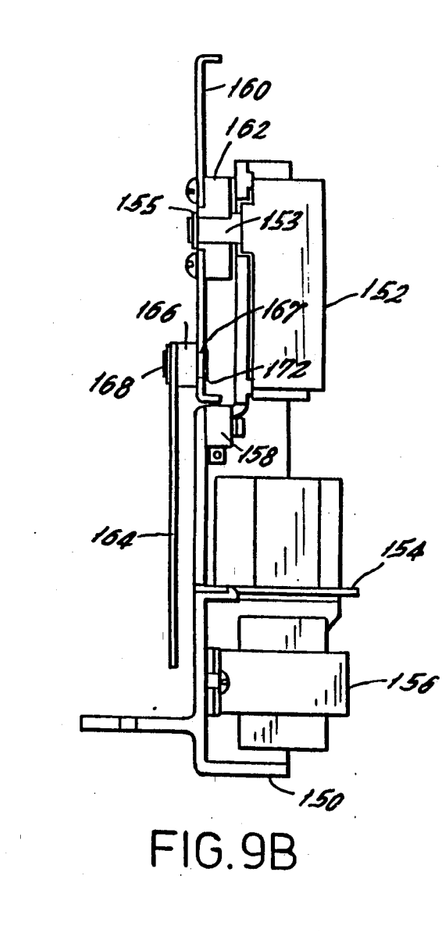
FIG. 9B is a cross-sectional side view of the motor assembly in FIG. 9A

An enlarged view of the assembled motor structure is illustrated in FIG. 9A. The components are mounted on a frame 150 including the motor 152, the power relay board 154, the transformer 156 and the microswitch 158. The first elongated rotatable plate 160 is illustrated projecting above frame 150. It is rotated by the motor 152. FIG. 9B is a cross-sectional view of the assembled motor structure. It can be seen in FIG. 9B that the first rotatable plate 160 is attached to shaft 153 of motor 152 and held in place in any well-known manner, such as by the use of an E-type ring clip 155. Retainer 162 attaches to the rotatable plate 160 to the motor shaft 153. The second elongated, pivotable plate 164 is attached to plate 160 by means of a shaft 166 which is secured in any well-known manner, such as by an E-type ring clip 172.

Figure 10A:
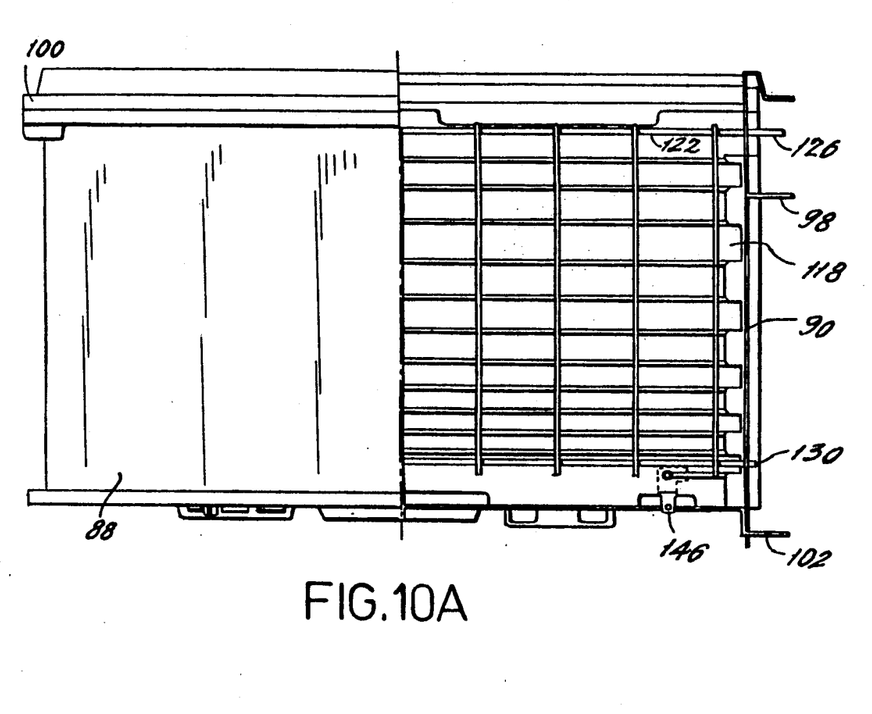
FIG. 10A is a partially broken away side elevation of the mechanical assembly of the toaster.

FIG. 10A is a partially broken away side elevation of the toaster mechanical assembly illustrating the side plate 88, the heating element 118 and its electrical contact 146, toast guard 122 with its upper projection 126 and lower projection 130 extending through front end plate 90. Also shown is horizontally extending projection 98 integrally formed with front end plate 90 and bottom plate 102.

Figure 10B:
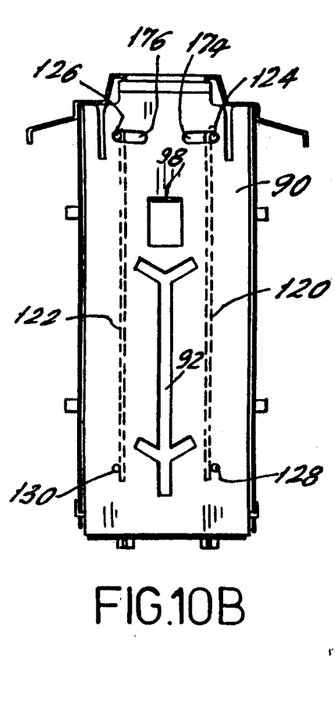
FIG. 10B is an end view of the toaster mechanical assembly.

FIG. 10B is an enlarged front view of the end plate 90 illustrating the details thereof. Slot 92 allows the projecting end 94 of the toast support structure 18 to travel vertically from the first raised position downwardly to the second lowered position. The toast guards 120 and 122 are pivotally supported by their lower projections 128 and 30 extending through corresponding orifices in plate 90 and have at the upper end projections 124 and 126 resting in slots 174 and 176, respectively, to allow the guards 120 and 122 to move outwardly or inwardly in their respective slots about pivot points 128 and 130.

Figure 10C:
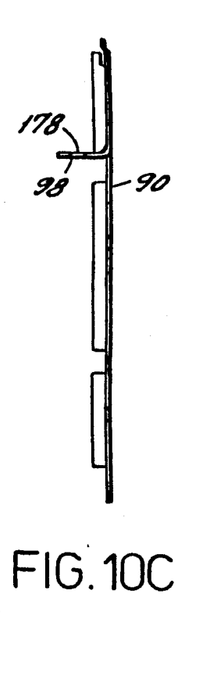
FIG. 10C is a side view of the mechanical assembly end plate shown in front view in FIG. 10B.

FIG. 10C is a side elevation of the plate 90 and illustrates the horizontally extending projection 98 having an orifice 178 therein for receiving the shaft 96 and assisting in holding it in position and for supporting the upper guide plate 104 and spring 108.

Figure 11A:
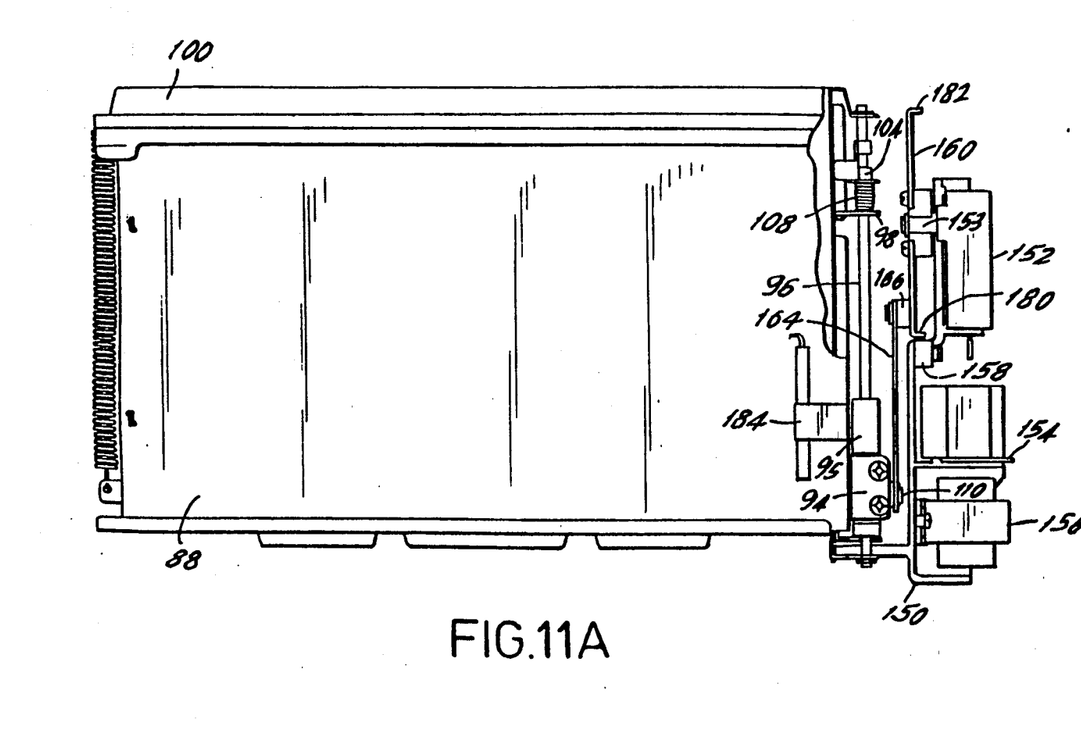
FIG. 11A is a side view of the toaster mechanical assembly illustrating in partial broken away section the operation of the toast elevator means by the electric motor.

FIG. 11A is a partially broken away side elevation of the mechanical assembly of the toaster illustrating the attached motor assembly and its connection to the carriage assembly 95 for raising and lowering the toaster elevator system. As can be seen in FIG. 11A, carriage assembly 95 is coupled to the projection 94 of the toast support structure 18 in any well-known means, such as by screws. Carriage assembly 95 is slidably mounted on shaft 96 for movement from the second lowered position as shown to a first upper position (as shown in FIG. 12B). The motor 152 is coupled through its shaft 153 to first rotatable plate 160. Plate 160 is coupled through pin 166 to second pivotable plate 164. Plate 164 is coupled to projection or pin 110 of carriage assembly 95.

Thus, as motor 152 rotates first plate 160, second plate 164 moves and carries with it carriage assembly 95, thus moving it up from the lowered position shown to an upper position for making the toast accessible. It will be noted that microswitch 158 is in proximity with a bent portion 180 of first plate 160. Thus, when the start button is depressed, an electrical connection is made to motor 152 and it rotates plate 160. When the blade 160 has rotated 180° from the position shown, the carriage assembly 95 is in its uppermost position. At that time, the bent portion 182 of the other end of plate 160 contacts microswitch 158 and generates an output signal to stop motor 152. The assembly works in a like manner in the opposite direction; if the start button is pressed, the motor 152 begins to rotate, thus pulling the carriage 95 downwardly. When it has rotated 180°, the bent portion 180 of plate 160 contacts microswitch 158, thus stopping the motor 152 with the toast in the lowered position. In like manner, when the toast cycle is completed and the program signal is coupled to the motor 152, it again operates to move the carriage 95 to its uppermost position. A temperature sensing unit 184 is utilized to generate a signal to the microprogrammer to indicate the temperature of the toaster in any well-known manner.

Figure 11B:
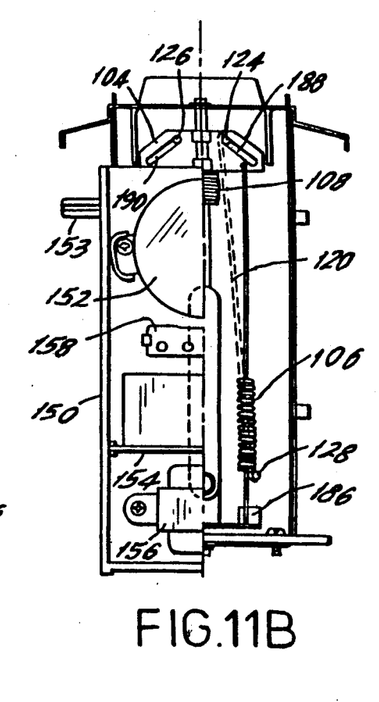
FIG. 11B is a partial end view of the mechanical assembly illustrating the operation of the top and bottom guide plates and the bread guards.

FIG. 11B is a partial front view of the motor assembly in FIG. 11A illustrating how the upper guide plate 104 is acted upon by the spring units. Thus, spring unit 106 and its companion spring 109 (shown in FIG. 8A) are coupled between orifices in upper guide plate 104 and bottom guide plate 186. Coil spring 108 is under the upper guide plate 104 and rests on projection 98 and pushes upwardly on plate 104. First and second spaced slots 188 and 190 in upper guide plate 104 extend at an angle such that when carriage assembly 95 moves downwardly and forces lower guide plate 186 downwardly, springs 106 and 107 pull the top guide plate 104 down to overcome the pressure of spring 108. The ends 124 and 126 of the bread guards 120 and 122 are forced to move towards each other and thus contact and center the bread or other food product in the toaster. Spring 108, which exerts a force upwards on plate 104, forces the bread guards apart when the carriage assembly moves upward. This action occurs because the upward movement of carriage assembly 95 removes the pressure from springs 106 and 109 and allows spring 108 to force upper guide plate 104 upwardly and cause the projections 124 and 126 to tend to move outwardly, thus allowing the bread guards 120 and 122 to separate.

Figure 12A:
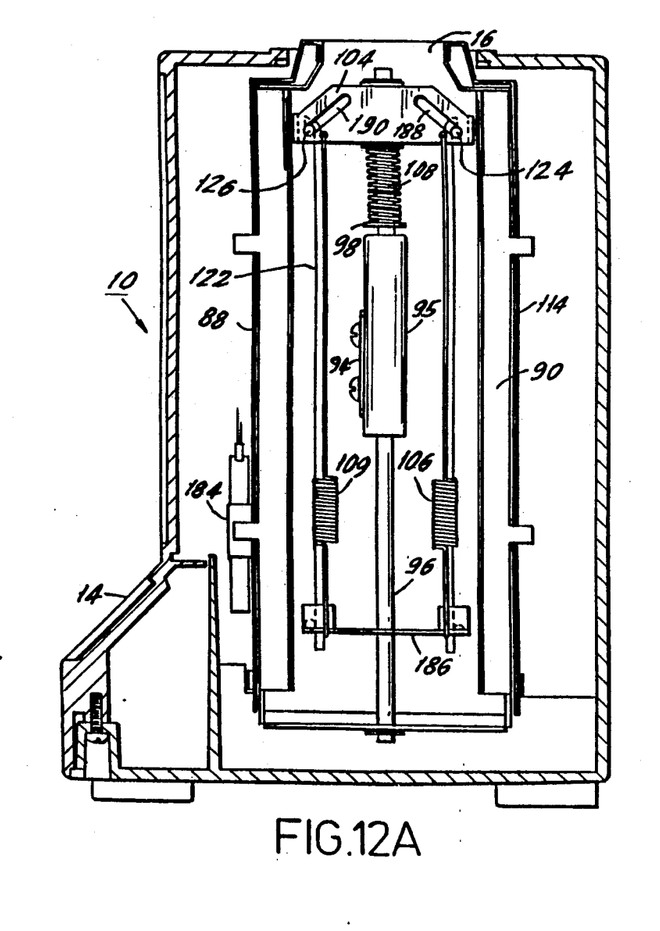
FIG. 12A is a partially broken away end view of the toaster illustrating the upper guide in a first position to separate the bread guards.
Figure 12B:
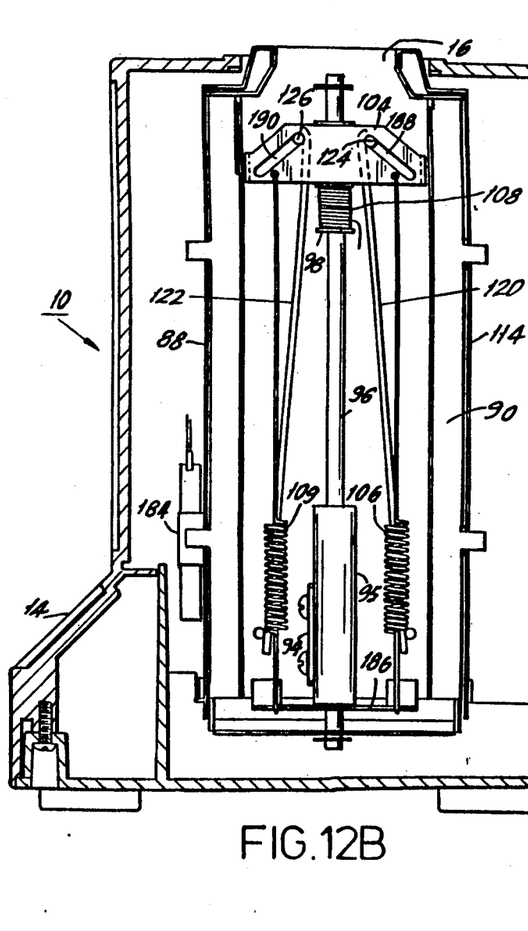
FIG. 12B is a cross-sectional end view of the entire toaster illustrating the position of the upper guide such that the bread guards are brought closer together to center the food product to be toasted.

FIG. 12A is a partial cross-sectional end view of the toaster illustrating the upper guide plate 104 in its down position because of springs 106 and 109 such that the projecting ends 124 and 126 of bread guards 120 and 122 are in the upper position of slots 188 and 190, respectively, and the inward positions of slots 174 and and 176, respectively. Thus, the elevator 18 is in the lowered position for toasting and the bread guards 120 and 122 are moved toward each other to center the toast.

FIG. 12B is a view similar to FIG. 12A illustrating the upper guide plate 104 in its upper position when toast or other food products are removed from or inserted in the toaster, illustrating that the upper-guide plate 104 has been moved to its upper position by spring 108, thus allowing the projections 124 and 26 of bread guards 120 and 122 to move downwardly in slots 188 and 190 and outwardly in slots 174 and 176 of front end plate 90 to accommodate the toast or food product inserted in the toaster.

The foregoing specification describes only the embodiments of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific constructional elements described may be replaced by any other known element having equivalent function.

We claim:

1. An automatic electric toaster for food products comprising:
    a housing;
    toasting means located within said housing for receiving and radiantly toasting food products;
    automatic elevator means associated with said toasting means for lowering said food products from a first raised position to a second lowered position for toasting said food products;
    memory means;
    means for storing a plurality of toasting cycle programs in said memory means, each of said programs operatively controlling said toasting means and generating signals to raise said elevator means when said toasting cycle is completed;
    control means for recalling one of said toasting cycle programs from said memory means and running said toasting cycle program; and
    means enabling the user to reprogram the toasting cycle programs in said memory means.

2. An automatic electric toaster as claimed in claim 1 further including clock and timer means.

3. An automatic electric toaster as claimed in claim 2 wherein said control means includes alarm means to indicate the end of a toasting cycle.

4. An automatic electric toaster as claimed in claim 3 wherein said programmable control means is adapted to sound said alarm coincidentally with elevation of the toasted product by the automatic elevator means.

5. An automatic electric toaster as claimed in claim 3 wherein said control means further includes a digital display to indicate alternatively time of day or remaining toasting time.

6. An automatic electric toaster as claimed in claim 2 wherein means are provided on said housing for use in programming and recalling said program cycles.

7. An automatic electric toaster as claimed in claim 6 wherein said programming and recalling means include pressure sensitive switches with associated indicator lights for program designation and pressure sensitive switches for setting said clock and timer means.

8. An automatic electric toaster as claimed in claim further including means for aborting said program cycles.

9. An automatic electric toaster as claimed in claim 8 wherein a selected one of said toasting cycle programs may be run by pressing a single button.

10. An automatic electric toaster as claimed in claim 1 including means for adjusting the selected toasting time by a compensation factor dependent on the time which has elapsed since the previous use of the toaster.

11. An automatic electric toaster as claimed in claim 1 wherein said automatic elevator means automatically lowers the food product into the housing at the beginning of the toasting cycle program and raises it at the end of the program.

12. A toaster as claimed in claim 1 wherein said automatic elevator means comprises:
  a toast support structure;
  a motor coupled to said programmable control means, said motor having a rotatable drive shaft;
  a start/stop control switch coupled to said motor; and
  means coupling said rotatable motor drive shaft to said toast support structure for selectively moving said toast support structure from said first raised position to said second lowered position for toasting upon operation of said control switch and from said second position to said first raised position for access upon generation of a signal from said control means when said toasting cycle is completed.

13. A toaster as claimed in claim 12 wherein said motor drive shaft coupling means comprises:
  a carriage assembly coupled to said toast support structure;
  a first plate coupled to said rotatable motor shaft for rotating with said shaft;
  a second plate pivotally coupled between said carriage assembly and said first plate such that the rotation of said first plate a first 180° causes said second plate to move said carriage assembly and attached toast support structure from said first raised position to said second lowered position and rotation of said first plate a second 180° causes said second plate to move said carriage assembly and attached toast support structure from said lowered position to said first raised position.

14. A toaster as claimed in claim 13 wherein said first and second plates are elongated flat rectangular plates.

15. A toaster as claimed in claim 14 further comprising:
  a first orifice in the midsection of said first plate for receiving said motor drive shaft and rotating therewith;
  a second orifice at one end of said first plate;
  a third orifice in one end of said second plate;
  a first pin rotatably inserted in said second and third orifices such that rotation of said first plate moves said second plate;
  a fourth orifice in the other end of said second plate; and
  a second pin attached to said toast support carriage assembly and rotatably inserted in said fourth orifice such that rotation of said first plate a first 180° moves said carriage assembly and said toast support structure from said first raised position to second lowered position and rotation of said first plate a second 180° moves said carriage assembly and said toast support structure from said lowered position to said raised position.

16. An automatic electric toaster for food products comprising:
  a housing;
  toasting means located within said housing for receiving and radiantly toasting food products;
  automatic elevator means associated with said toasting means for lowering said food products from a first raised position to a second lowered position for toasting said food products;
  programmable control means for storing a toasting cycle program for operatively controlling said toasting means and generating signals to raise said elevator means when said toasting cycle is completed, said programmable control means including means for recording and operatively running a plurality of predetermined and preselected ones of said toasting cycle programs;
  said automatic elevator means comprising a toast support structure, a motor coupled to said programmable control means, said motor having a rotatable drive shaft, a start/stop control switch coupled to said motor, and means coupling said rotatable motor drive shaft to said toast support structure for selectively moving said toast support structure from said first raised position to said second lowered position for toasting upon operation of said control switch and from said second position to said first raised position for access upon generation of a signal from said programmable control means when said toasting cycle is completed;
  said motor drive shaft coupling means comprising a carriage assembly coupled to said toast support structure, a first elongated flat rectangular plate coupled to said rotatable motor shaft for rotating with said shaft, a second elongated flat rectangular plate pivotally coupled between said carriage assembly and said first plate such that the rotation of said first plate a first 180° caused said second plate to move said carriage assembly and attached support structure from said first raised position to said second lowered position and rotation of said first plate a second 180° caused said second plate to move said carriage assembly and attached toast support structure from said lowered position to said first raised position;
  a first orifice in the midsection of said first plate for receiving said motor drive shaft and rotating therewith;
  a second orifice at one end of said first plate;
  a third orifice in one end of said second plate;
  a first pin rotatably inserted in said second and third orifices such that rotation of said first plate moves in said second plate;
  a fourth orifice in the other end of said second plate;
  a second pin attached to said toast support carriage assembly and rotatably inserted in said fourth orifice such that rotation of said first plate a first 180° moves said carriage assembly and said toast support structure from said first raised position to said second lowered position and rotation of said first plate a second 180° moves said carriage assembly and said toast support structure from said lowered position to said raised position;
  a front end plate coupled to said housing;
  an elongated vertical slot in said front end plate, said toast support structure extending through said vertical slot and coupled to said carriage assembly;
  an upper guide plate having an orifice therein;
  a lower guide plate coupled to said housing and having an orifice therein;
  a verticallyextending orifice in said carriage assembly; and
  an elongated shaft extending vertically through said orifice in said upper guide plate, said carriage assembly and said lower guide plate for guiding said carriage assembly and said attached toast support structure between its lowered position and its raised position.

17. A toaster as claimed in claim 16 further comprising:
  a first and second toasting means in spaced relationship for toasting both sides of a food product;

toast guard means for preventing said food product from contacting said toasting means during toasting; and means for causing said toast guard means to assume a first position and center said food product between said first and second toasting means during toasting and a second position for releasing said food product after toasting.

18. A toaster as claimed in claim 17 further comprising:
 a first toast guard means associated with one of said toasting means; and
 a second toast guard means associated with the other of said toasting means.

19. A toaster as claimed in claim 16 wherein said means for causing said toast guard means to assume said first and second positions further comprises:
 a flat, horizontal extension protruding from said front end plate;
 an orifice in said flat extension for receiving said elongated vertical shaft;
 a top and bottom protrusion extending from each end of each toast guard;
 a rear end plate;
 an orifice on each side of the lower portion of both the front and rear end plates for pivotally receiving a respective one of the bottom protrusions of a respective toast guard; and
 a generally horizontal slot in each side of the upper portion of the front and rear end of plates for slidably receiving a respective one of the top protrusions of a respective toast guard such that each toast guard can pivot about the lower protrusion and cause the upper portion of the toast guards to move in said slot toward and away from the upper portion of the other toast guard to assume said first and second positions for centering and releasing said food product.

20. A toaster as claimed in claim 19 further comprising:
 said upper guide plate being slidably mounted on said shaft from a first lowered position to a second raised position; and
 first and second spaced slots in said upper guide plate for slidably receiving the top protrusion of a respective toast guard extending through the corresponding horizontal slot in said end plate, said first and second spaced slots extending at an angle such that in said second raised position of said upper guide plate, said toast guards are forced away from each other and said toast, and in said first lowered position, said toast guards are forced towards each other to center said food product.

21. A toaster as claimed in claim 20 further comprising:
 a first spring positioned between said first guide plate and said flat horizontal extension on said end plate to force said upper guide plate upwardly in the direction of said second raised position; and
 at least one second spring attached between said upper guide plate and said lower guide plate to force said upper guide plate downwardly and in the direction of said second lowered position when said carriage assembly strikes said lower guide plate.

* * * * *